(12) United States Patent
Teshima et al.

(10) Patent No.: US 11,060,518 B2
(45) Date of Patent: Jul. 13, 2021

(54) RECIPROCATING PUMP

(71) Applicant: NIPPON PILLAR PACKING CO., LTD., Osaka (JP)

(72) Inventors: Kazukiyo Teshima, Osaka (JP); Daisuke Urata, Osaka (JP); Naoto Yamada, Osaka (JP); Takuya Murakami, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 141 days.

(21) Appl. No.: 16/314,710

(22) PCT Filed: May 1, 2017

(86) PCT No.: PCT/JP2017/017128
§ 371 (c)(1),
(2) Date: Jan. 2, 2019

(87) PCT Pub. No.: WO2018/025461
PCT Pub. Date: Feb. 8, 2018

(65) Prior Publication Data
US 2019/0154532 A1    May 23, 2019

(30) Foreign Application Priority Data

Aug. 3, 2016 (JP) .............................. JP2016-152587

(51) Int. Cl.
*F04B 49/08* (2006.01)
*F04B 49/06* (2006.01)
(Continued)

(52) U.S. Cl.
CPC .......... *F04B 49/08* (2013.01); *F04B 43/0081* (2013.01); *F04B 43/02* (2013.01);
(Continued)

(58) Field of Classification Search
CPC .. F04B 43/02; F04B 43/0081; F04B 2205/03; F04B 49/065; F04B 43/067; F04B 49/08;
(Continued)

(56) References Cited

U.S. PATENT DOCUMENTS 3,847,507 A * 11/1974 Sakiyama ............... F04B 49/06
                                                            417/22
5,869,766 A    2/1999 Cucci et al.
(Continued)

FOREIGN PATENT DOCUMENTS

| CN | 1268907 C | 8/2006 |
|----|-----------|--------|
| JP | 5-256263 A | 10/1993 |

(Continued)

OTHER PUBLICATIONS

International Search Report dated Jul. 18, 2017, in PCT/JP2017/017128, filed May 1, 2017.
(Continued)

*Primary Examiner* — Peter J Bertheaud
(74) *Attorney, Agent, or Firm* — Oblon, McClelland, Maier & Neustadt, L.L.P.

(57) ABSTRACT

A reciprocating pump includes: a housing with a fluid channel that includes a pump chamber; a reciprocated member that is disposed in the housing to form the pump chamber, and reciprocable for suction and discharge of fluid; an actuator configured to reciprocate the reciprocated member; and a pressure gauge with a pressure receiving portion, configured to detect pressure of the fluid in the fluid channel via the pressure receiving portion. The housing includes an inner wall facing the fluid channel, and a flexible, membranous portion placed continuously next to the inner wall to face the fluid channel. The pressure gauge is attached to the housing such that the membranous portion is sandwiched between the pressure receiving portion and the fluid channel.

3 Claims, 8 Drawing Sheets

(51) Int. Cl.
*F04B 43/02* (2006.01)
*F04B 43/067* (2006.01)
*F04B 45/04* (2006.01)
*G01L 19/06* (2006.01)
*F04B 53/16* (2006.01)
*G01L 19/00* (2006.01)
*G01L 19/14* (2006.01)
*F04B 43/00* (2006.01)
*F04B 43/08* (2006.01)

(52) U.S. Cl.
CPC ............ *F04B 43/067* (2013.01); *F04B 45/04* (2013.01); *F04B 49/065* (2013.01); *F04B 53/162* (2013.01); *G01L 19/0023* (2013.01); *G01L 19/0038* (2013.01); *G01L 19/0627* (2013.01); *G01L 19/0645* (2013.01); *G01L 19/0672* (2013.01); *G01L 19/147* (2013.01); *F04B 43/08* (2013.01); *F04B 2205/03* (2013.01); *F04B 2207/042* (2013.01)

(58) Field of Classification Search
CPC ............ F04B 43/0063; F04B 2207/042; F04B 45/04; F04B 53/162; F04B 43/08; G01L 19/0023; G01L 19/0038; G01L 19/069; G01L 19/0645; G01L 19/0672; G01L 19/0046; G01L 19/0627; G01L 19/147
See application file for complete search history.

(56) References Cited

U.S. PATENT DOCUMENTS

| | | | |
|---|---|---|---|
| 7,293,967 B2 * | 11/2007 | Fukano | ............ F04B 9/02 417/413.1 |
| 2003/0037618 A1 | 2/2003 | Okawa | |
| 2004/0234382 A1 | 11/2004 | Textor | |
| 2016/0153443 A1* | 6/2016 | Glass | ............ F04B 51/00 417/53 |

FOREIGN PATENT DOCUMENTS

| | | |
|---|---|---|
| JP | 2001-525538 A | 12/2001 |
| JP | 2003-65872 A | 3/2003 |
| JP | 2007-23935 A | 2/2007 |

OTHER PUBLICATIONS

Chinese Office Action dated Sep. 23, 2019 in Chinese Patent Application No. 201780041500.1 (with English translation), 10 pages.

Office Action dated Jan. 20, 2021 in South Korean Patent Application No. 10-2019-7000495 with English translation.

* cited by examiner

PRIOR ART

RECIPROCATING PUMP

TECHNICAL FIELD

The present invention relates to reciprocating pumps.

BACKGROUND ART

Reciprocating pumps are known, which are for transferring fluids including liquids such as chemical solutions. The reciprocating pumps include, for example, diaphragm pumps as described in Patent Document 1. The diaphragm pumps are frequently used for manufacturing semiconductor, liquid crystal, and organic electroluminescence (EL) devices, solar cells, and light emitting diodes (LED).

Such a reciprocating pump includes a housing, a reciprocated member, an actuator, and a pressure gauge. The housing has a suction port and a discharge port. The reciprocated member, which consists of a rolling diaphragm or the like, is disposed to form a pump chamber in the housing.

The reciprocated member is reciprocable in the housing such that fluid is sucked into the pump chamber through the suction port, and then discharged from the pump chamber through the discharge port.

The actuator is configured to reciprocate a movable member. The pressure gauge has a pressure receiving portion and is configured to detect the pressure of the fluid in the pump chamber via the pressure receiving portion. The pressure gauge is attached to the housing.

PRIOR ART DOCUMENT

Patent Document

Patent Document 1: Japanese Unexamined Patent Application

SUMMARY OF THE INVENTION

As shown in FIG. 8, a conventional reciprocating pump uses a pressure gauge 206, which is of a type screwed to a main body. A mounting hole 233 for the pressure gauge 206, which communicates with a fluid channel 228, is provided in a wall 211 of a housing 202. The pressure gauge 206 is screwed to the mounting hole 233 to be attached to the wall 211 of the housing 202.

A pressure receiving portion 246 of the pressure gauge 206 is then placed around the fluid channel 228 to face the fluid channel 228. Between the pressure receiving portion 246 and the fluid channel 228, space 238 exists, which is caused by a step in the mounting hole 233, residual threads, or the like. When fluid fills the fluid channel 228, a liquid pool forms in the space 238 or the mounting hole 233, which communicates with the fluid channel 228.

When the liquid pool forms, particles tend to appear in the liquid pool. The particles may be mixed in the fluid filling the fluid channel 228, thereby lowering the purity of the fluid transferred by the reciprocating pump through the fluid channel 228.

The present invention has been made in view of such circumstances. An object of the present invention is to provide a reciprocating pump capable of preventing a liquid pool from forming in a fluid channel due to what structure allows a pressure gauge to be mounted thereon.

A reciprocating pump for transferring fluid according to one aspect of the present invention includes: a housing with a fluid channel that includes a suction port, a discharge port, and a pump chamber communicating with the ports; a reciprocated member that is disposed in the housing to form the pump chamber in a reciprocable manner such that the fluid is sucked into the pump chamber through the suction port and discharged from the pump chamber through the discharge port; an actuator configured to reciprocate the reciprocated member; and a pressure gauge with a pressure receiving portion, configured to detect pressure of the fluid in the fluid channel via the pressure receiving portion. The housing includes: an inner wall facing the fluid channel; and a membranous portion having flexibility and placed continuously next to the inner wall to face the fluid channel. The pressure gauge is attached to the housing such that the membranous portion is sandwiched between the pressure receiving portion and the fluid channel.

This configuration prevents space, which causes a liquid pool when fluid fills the fluid channel, from being formed in the fluid channel due to what structure allows the pressure gauge to be mounted to the housing. This results in no liquid pool in the fluid channel. Therefore, the reciprocating pump can be used to transfer fluid, while maintaining the fluid at excellent purity.

According to another aspect of the present invention, the reciprocated member includes a rolling diaphragm.

According to still another aspect of the present invention, the reciprocated member includes a bellows.

The present invention can provide a reciprocating pump capable of preventing a liquid pool from forming in a fluid channel due to what structure allows a pressure gauge to be mounted thereon.

DESCRIPTION OF THE EMBODIMENTS

A first embodiment of the present invention will be described with reference to the drawings.

Figure 1:
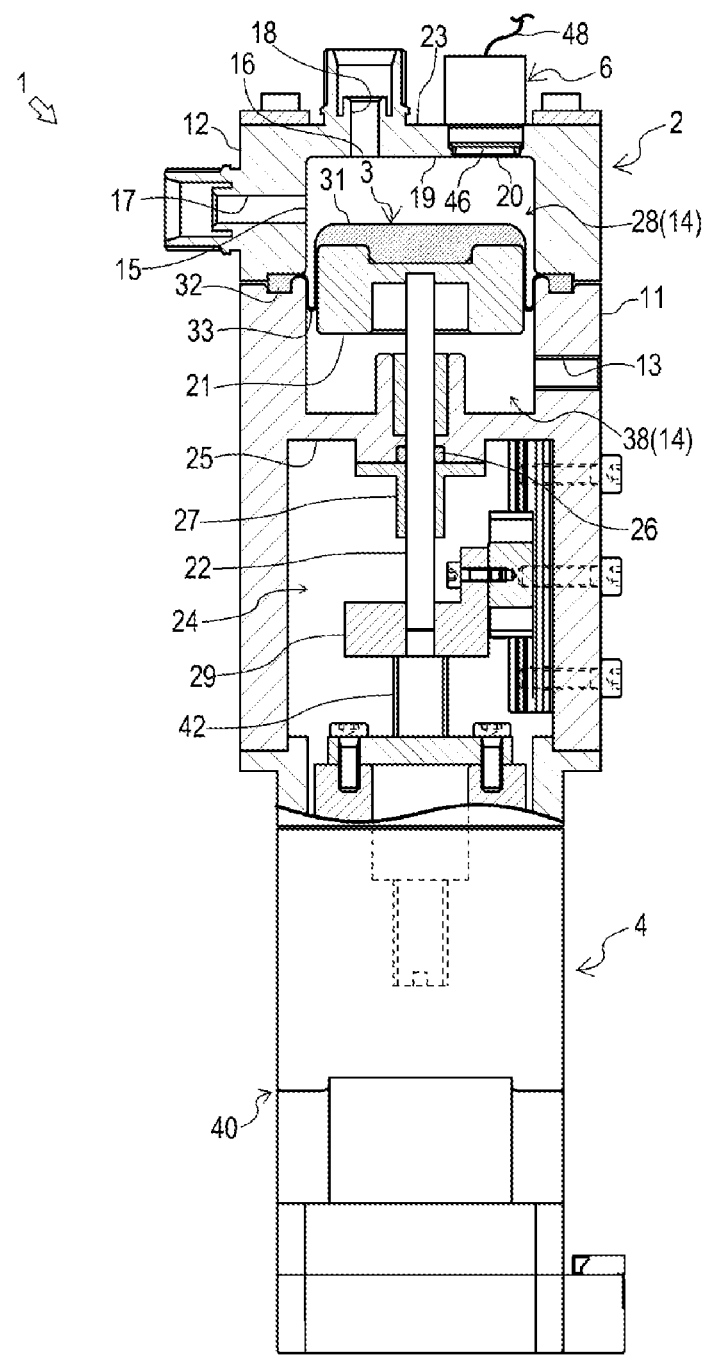
FIG. 1 is a side sectional view of a reciprocating pump according to a first embodiment of the present invention, showing the reciprocating pump after completion of a discharge.
Figure 2:
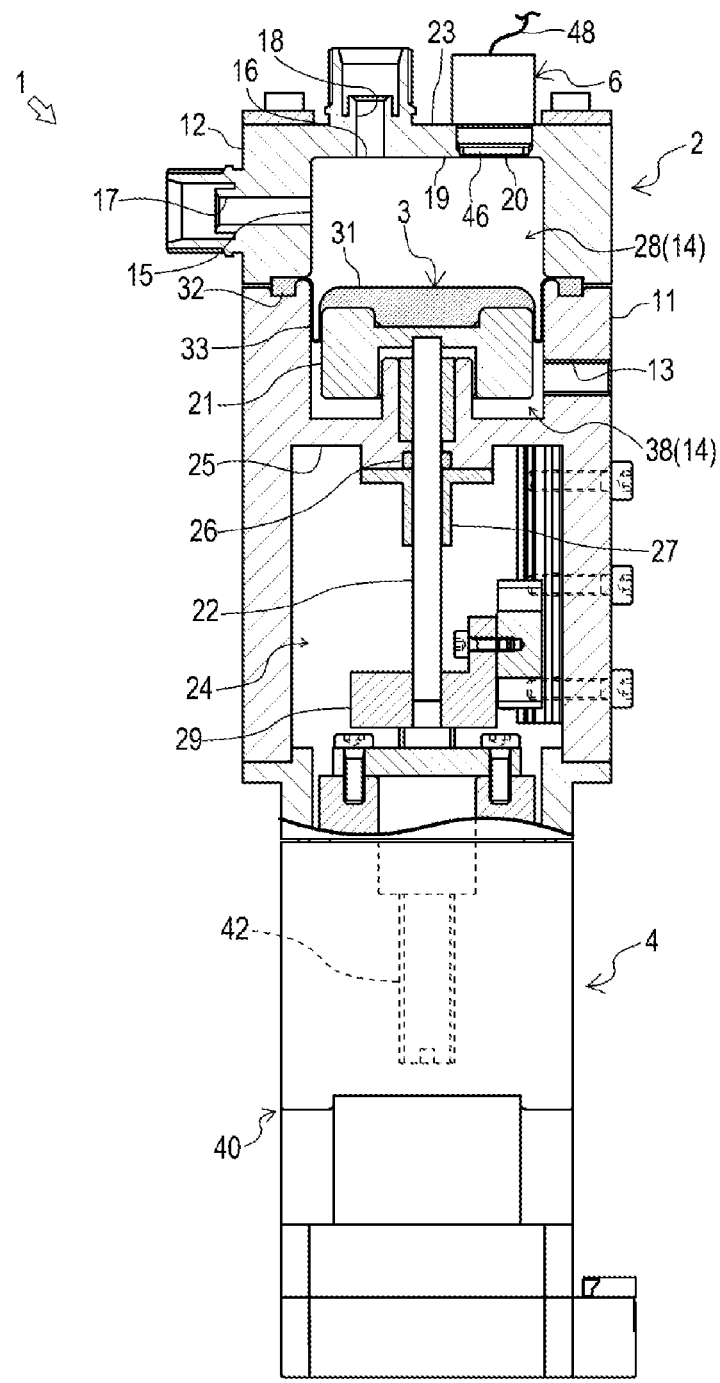
FIG. 2 is a side sectional view showing the reciprocating pump of FIG. 1 after completion of a suction.
Figure 4:
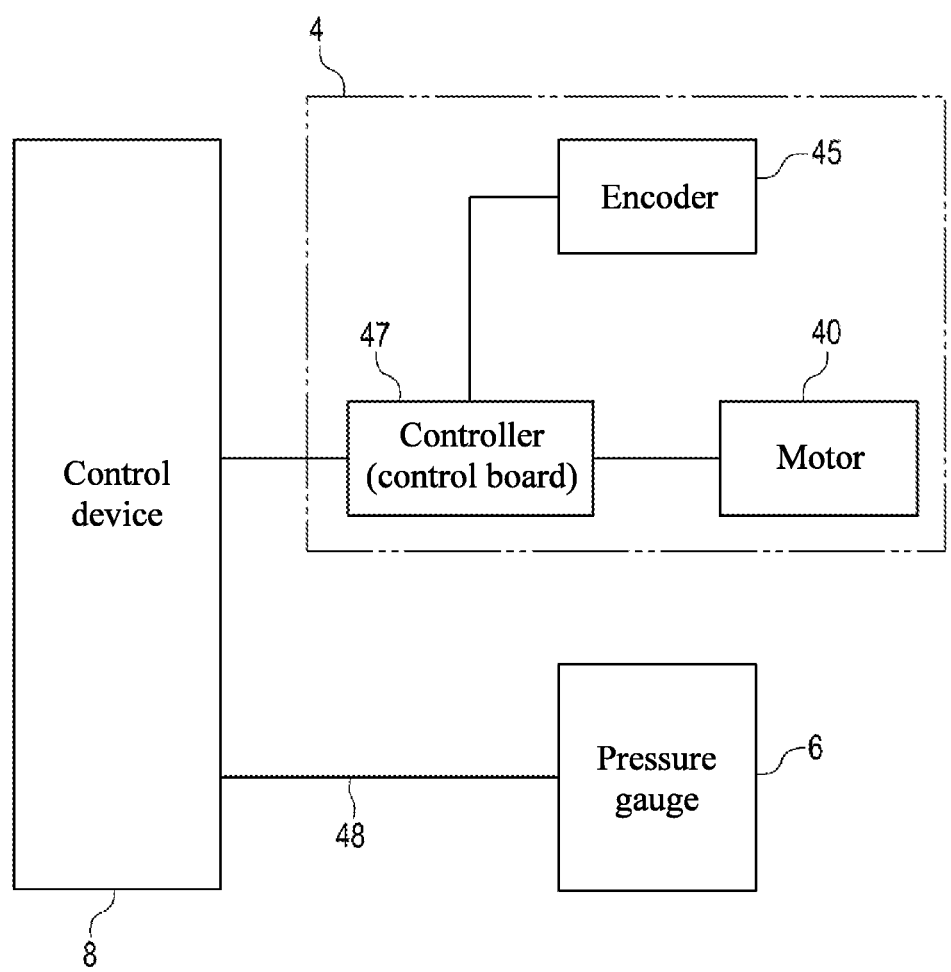
FIG. 4 is a schematic block diagram of the reciprocating pump in FIG. 1.

A reciprocating pump according to the first embodiment of the present invention is a diaphragm pump 1 for transferring fluid including liquids such as chemical solutions. As shown in FIGS. 1 and 2, the diaphragm pump 1 includes a housing 2, a reciprocated member (rolling diaphragm) 3, an actuator 4, and a pressure gauge 6. As shown in FIG. 4, the diaphragm pump 1 further includes a control device 8.

In the following description, a back-and-forth direction means a vertical direction on the drawings, advancement means forward movement, and retreat means backward movement.

The housing 2 has a fluid channel including a suction port 15, a discharge port 16, and a pump chamber 28 communicating with the ports. The housing 2 includes a cylinder 11 and a pump head 12. The cylinder 11 is made of stainless steel such as SUS 304. The cylinder 11 has a cylindrical shape and is disposed so that its axial direction is the back-and-forth direction.

The cylinder 11 has a vent hole 13. The vent hole 13 is provided in a side portion of the cylinder 11, extending therethrough in a direction crossing the axial direction of the cylinder 11 (that is, the axial direction of the housing 2). The vent hole 13 can be connected to a decompression device (not shown) such as a vacuum pump or an aspirator.

The pump head 12 is made of resin and/or metal. For example, the pump head 12 is made of fluororesin such as polytetrafluoroethylene (PTFE). The pump head 12 has a covered cylindrical shape with an inner diameter substantially the same as that of the cylinder 11. The pump head 12 is disposed coaxially with the cylinder 11.

The pump head 12 is attached to a first axial end (a front end) of the cylinder 11 to close an opening on the first axial side (the front side) of the cylinder 11. Thus, first interior space 14 is formed to be surrounded by the cylinder 11 and the pump head 12 in the housing 2.

The pump head 12 has the suction port 15, the discharge port 16, a suction-side fluid channel 17, and a discharge-side fluid channel 18. The suction-side fluid channel 17 is placed in a side portion of the pump head 12 to communicate with the suction port 15. The suction-side fluid channel 17 is connected to a device (not shown) predetermined as a fluid source via a suction-side valve, piping, and others.

The discharge-side fluid channel 18 is placed in a first axial end (a front end) of the pump head 12, that is, a lid 23 to communicate with the discharge port 16. The discharge-side fluid channel 18 is connected to a device (not shown) predetermined as a fluid destination via a discharge-side valve, piping, and others.

Figure 3:
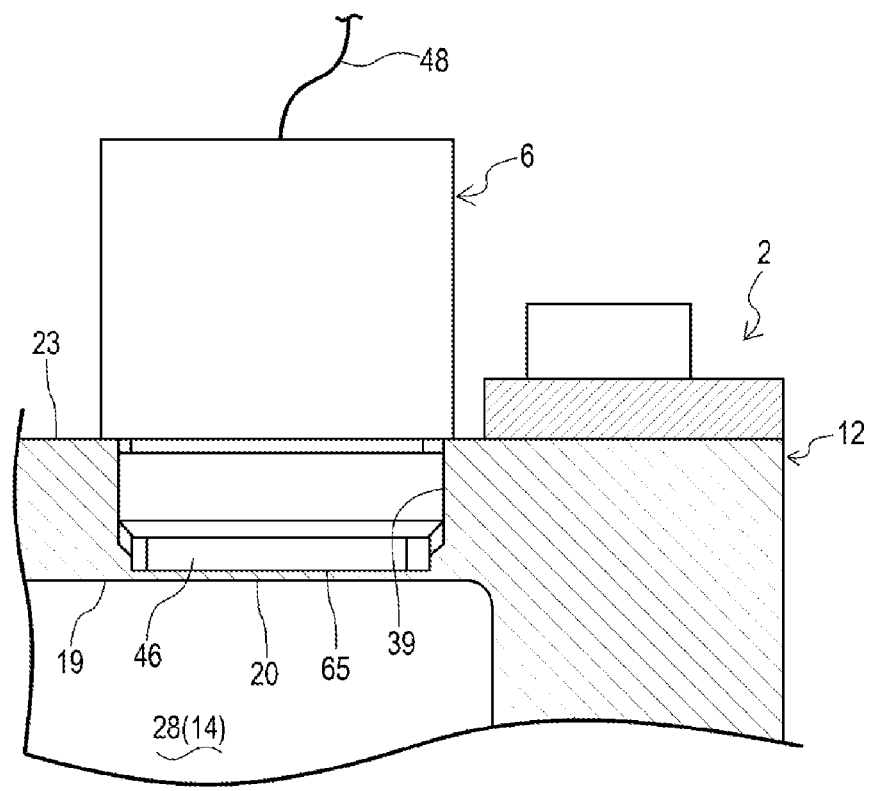
FIG. 3 is a side sectional view of the mounting structure of a pressure gauge in the reciprocating pump in FIG. 1.

As also shown in FIG. 3, the housing 2 has an inner wall 19 and a membranous portion 20. The inner wall 19 faces the fluid channel. The membranous portion 20 has flexibility and is placed continuously next to the inner wall 19 to face the fluid channel.

The inner wall 19 is included in the pump head 12 (the lid 23) and faces the pump chamber 28 in the fluid channel. The pump chamber 28 occupies a part of the first interior space 14 to communicate with the suction port 15 and the discharge port 16.

The membranous portion 20 is included in the pump head 12 (the lid 23) and is placed continuously next to the inner wall 19 to face the pump chamber 28 in the fluid channel. The membranous portion 20 is disposed such that its inner surface facing the pump chamber 28 is substantially coplanar with the inner surface of the inner wall 19 facing the pump chamber 28.

The actuator 4 is configured to reciprocate the rolling diaphragm 3. The actuator 4 has a piston 21 and a shaft 22. The piston 21 and the shaft 22 are reciprocable in the housing 2.

The piston 21 is made of, for example, an aluminum alloy. The piston 21 has a cylindrical shape including a recess. The piston 21 is disposed coaxially with the housing 2 (the cylinder 11). The piston 21 is accommodated in the first interior space 14 of the housing 2.

The piston 21 is provided to create a clearance between the piston 21 and the inner wall of the housing 2 (the cylinder 11 and the pump head 12). The piston 21 is reciprocable along the inner wall of the housing 2 in the axial direction (the back-and-forth direction) of the housing 2.

The shaft 22 is made of steel such as quenched high-carbon chromium bearing steel, for example. The shaft 22 is disposed coaxially with the piston 21. The shaft 22 extends through a partition 25 of the housing 2 via an O-ring 26 so that the shaft 22 can be reciprocated in the axial direction of the housing 2. The partition 25 divides the interior of the housing 2 into the first interior space 14 and a second interior space 24.

The O-ring 26 is held in the partition 25 by an O-ring retainer 27. The O-ring retainer 27 is made, for example, of stainless steel. The O-ring retainer 27 is disposed in the second interior space 24 of the housing 2 with the shaft 22 extending therethrough without contact with the O-ring retainer 27.

The shaft 22 has a first axial end (a front end) located in the first interior space 14 and a second axial end (a back end) located in the second interior space 24. The shaft 22 is connected to the piston 21 at the first axial end so that the shaft 22 can be reciprocated with the piston 21 in an integrated manner.

The actuator 4 has a shaft holder 29 for holding the shaft 22 in the housing 2. The shaft holder 29 is made of, for example, stainless steel. The shaft holder 29 is disposed in the second interior space 24 of the housing 2. The shaft holder 29 connects the shaft 22 with an output shaft 42 described later.

The rolling diaphragm 3 is disposed to form the pump chamber 28 in the housing 2. The rolling diaphragm 3 is reciprocable in the housing 2 to cause fluid to be sucked into the pump chamber 28 through the suction port 15 and to be discharged from the pump chamber 28 through the discharge port 16.

The rolling diaphragm 3 is made of resin. For example, the rolling diaphragm 3 is made of fluororesin such as polytetrafluoroethylene (PTFE). The rolling diaphragm 3 has a central portion that has a covered tubular shape. The rolling diaphragm 3 is disposed in the housing 2 to cover the piston 21 with the central portion from the first axial side (the front side).

Specifically, the rolling diaphragm 3 has a central portion 31, an outer peripheral portion 32, and a folded portion 33. The central portion 31, which constitutes a circular lid portion of the rolling diaphragm 3, is attached to the piston 21 to face the pump chamber 28 and a first axial end (a ceiling) of the housing 2, that is, the lid 23.

The outer peripheral portion 32, which constitutes a circular outer peripheral edge portion of the rolling diaphragm 3, is disposed radially outward of the central portion 31 and held between the cylinder 11 and the pump head 12. The folded portion 33 has flexibility. The folded portion 33 is provided in a deformable manner between the central portion 31 and the outer peripheral portion 32.

The rolling diaphragm 3 can be reciprocated integrally with the piston 21. The outer peripheral portion 32 is fixed to the housing 2; the folded portion 33 can be deformed between the inner wall of the housing 2 and the piston 21; the central portion 31 can be changed in position in the axial direction of the housing 2.

The rolling diaphragm 3 partitions the first interior space 14 of the housing 2 into the pump chamber 28 and a decompression chamber 38 liquid-tightly and airtightly. The pump chamber 28 is formed to be enclosed by the rolling diaphragm 3 (the central portion 31 and the folded portion 33) and the pump head 12.

Consequently, the pump chamber 28 can be changed (increased or decreased) in volume by change in the position of the rolling diaphragm 3 in the housing 2; the change accompanies reciprocation of the rolling diaphragm 3 integrated with the piston 21 in the axial direction of the housing 2, that is, change in the position of the central portion 31 accompanies deformation of the folded portion 33.

During operation of the diaphragm pump 1, the pump chamber 28 can temporarily store fluid sucked through the suction port 15 until it is discharged to the outside. The decompression chamber 38 communicates with the vent hole 13 to be depressurized by the decompression device.

The first interior space 14 is partitioned by the rolling diaphragm 3 into the pump chamber 28 and the decompression chamber 38 in the present embodiment. This is not a limiting condition. The first interior space 14 may be partitioned into the pump chamber 28 and an atmosphere chamber communicating with the atmosphere through the vent hole 13.

The actuator 4 in the diaphragm pump 1 includes a motor 40 as a drive source. The actuator 4 in the present embodiment includes the output shaft 42 in addition to the piston 21, the shaft 22, and the motor 40.

The motor 40 is a pulse motor (a stepping motor). The motor 40 is provided on the second axial side (the back side) of the shaft 22. The output shaft 42 is a screw shaft (a lead screw). The output shaft 42 is connected to be interlocked with the rotating shaft of the motor 40.

The motor 40 is not limited to a particular type. The motor 40 may be a type other than a pulse motor (a stepping motor).

The output shaft 42 is reciprocable in the axial direction of the housing 2 and projected from the motor 40 into the housing 2. The output shaft 42 is disposed coaxially with the shaft 22 and connected at a protruding end (a front end) thereof to the second axial end (the back end) of the shaft 22 via the shaft holder 29.

The description that the shaft 22 is connected to the piston 21 and the rolling diaphragm 3 is attached to the piston 21 does not mean that the piston 21 must be fixed. Specifically, when the decompression chamber 38 or the atmosphere chamber is provided in the first interior space 14, and the pressure in the decompression chamber 38 or the atmosphere chamber is constantly kept lower than the pressure in the pump chamber 28 (the pressure of fluid flowing into the pump chamber 28), the piston 21 does not have to be fixed to the rolling diaphragm 3 and the shaft 22.

The actuator 4 can convert rotational motion of the motor 40 into linear motion and transmit the motion from the output shaft 42 to the shaft 22 via the output shaft 42, the shaft 22, and the piston 21 so that the actuator 4 can reciprocate the rolling diaphragm 3 in the axial direction of the housing 2.

The actuator 4 uses an encoder 45 (see FIG. 4). The encoder 45 is attached to the rotating shaft of the motor 40. The encoder 45 is for the drive control of the motor 40. The encoder 45 is configured to output signal pulses synchronized with the rotation of the motor 40.

The pressure gauge 6 has a pressure receiving portion 46. The pressure gauge 6 is configured to detect the pressure in the fluid channel via the pressure receiving portion 46. The pressure gauge 6 is attached to the housing 2 such that the membranous portion 20 in the housing 2 is sandwiched between the pressure receiving portion 46 and the fluid channel.

The pressure gauge 6 in the present embodiment is configured to detect the pressure of fluid in the pump chamber 28 of the fluid channel with the pressure receiving portion 46. The pressure gauge 6 is attached to the pump head 12 such that the membranous portion 20 is sandwiched between the pressure receiving portion 46 and the pump chamber 28.

More specifically, as shown in FIG. 3, the pressure gauge 6 is attached to the lid 23 of the pump head 12. The pressure gauge 6 is held by a holding means such that the pressure gauge 6 is placed from the outside of the pump head 12 (the housing 2) into a recess 39 in the lid 23 of the pump head 12, and the pressure receiving portion 46 (its abutting surface 65) abuts on the membranous portion 20.

The pressure gauge 6 is positioned by the holding means in a location appropriate for the pressure receiving portion 46 to abut on the membranous portion 20; The pressure gauge 6 tightly fits in the recess 39 of the pump head 12 from the first axial side (the front side). The abutting surface 65 of the pressure gauge 6 is shaped to suit the membranous portion 20, that is, a substantially flat shape.

In this way, the pressure gauge 6 is attached to the housing 2 with the pressure receiving portion 46 (the abutting surface 65) brought into contact with the membranous portion 20 from the first axial side (the front side); that is, at least apart of the pressure gauge 6, which includes the pressure receiving portion 46, is incorporated in the housing 2 such that the pressure gauge 6 is isolated from the pump chamber 28.

Wiring 48 of the pressure gauge 6 leads to the outside. The membranous portion 20 in contact with the pressure receiving portion 46 of the pressure gauge 6 has a shape so flexible that the membranous portion 20 does not interfere with the function of the pressure receiving portion 46 of the pressure gauge 6 to detect the pressure of fluid in the pump chamber 28 (the fluid channel).

Specifically, the membranous portion 20 is made of resin and/or metal. For example, the membranous portion 20 is made of the same kind of material as the pump head 12. The membranous portion 20 is formed such that its thickness falls within the range from about 0.1 mm to about 1 mm, preferably from about 0.1 mm to about 0.5 mm.

The control device 8 is used for controlling the actuator 4 to move the rolling diaphragm 3 forward or backward. As shown in FIG. 4, the control device 8 is connected to the motor 40 and the encoder 45 via a controller (control board) 47; the control device 8 is connected to the pressure gauge 6 via the wiring 48.

Note that forward movement in the reciprocation of the rolling diaphragm 3 is movement in a forward direction (a direction to decrease the volume of the pump chamber 28) (advancement), and backward movement is movement in an opposite backward direction (a direction to increase the volume of the pump chamber 28) (retreat).

The control device 8 is configured to output a drive signal to the controller 47 to control the drive of the motor 40. The controller 47 is configured to output signal pulses for driving the motor 40 to the motor 40 based on the drive signal.

The controller 47 acquires signal pulses from the encoder 45; Based on the acquired signal pulses (pulse number), the controller 47 detects the rotation amount (the angle of rotation), or the like, of the motor 40; The controller 47 outputs the detected rotation amount or the like to the control device 8.

This allows the control device 8 to determine a position of the rolling diaphragm 3 in the reciprocating direction based on the rotation amount or the like acquired from the controller 47. The control device 8 can also acquire a result of detection of the pressure gauge 6 to determine the pressure of fluid in the pump chamber 28.

The control device 8 is configured to perform the drive control of the motor 40 to reciprocate the rolling diaphragm 3 in the axial direction of the housing 2 such that suction and discharge processes are alternately performed for fluid transfer during operation of the diaphragm pump 1.

Specifically, when the rolling diaphragm 3 performs a suction process, the control device 8 causes the motor 40 to rotate in a negative direction to move the rolling diaphragm 3 backward to displace it in a direction to increase the volume of the pump chamber 28 (from the position shown in FIG. 1 to the position shown in FIG. 2). At that time, the control device 8 also controls opening of the suction-side valve and close the discharge-side valve. Consequently, fluid is sucked into the pump chamber 28 through the suction port 15.

When the rolling diaphragm 3 performs a discharge process, the control device 8 causes the motor 40 to rotate in a positive direction to move the rolling diaphragm 3 forward to displace it in a direction to decrease the volume of the pump chamber 28 (from the position shown in FIG. 2 to the position shown in FIG. 1). At that time, the control device 8 also controls closing of the suction-side valve and open the discharge-side valve. Consequently, the fluid is discharged from the pump chamber 28 through the discharge port 16.

The above-described configuration prevents space, which causes a liquid pool when fluid fills the fluid channel (the pump chamber 28), from being formed in the fluid channel due to what structure allows the pressure gauge 6 to be mounted thereon. Thus, no liquid pool can form in the fluid channel. Therefore, the diaphragm pump 1 can be used to transfer fluid, while maintaining the fluid at excellent purity.

A second embodiment of the present invention will be described with reference to the drawings.

Figure 5:
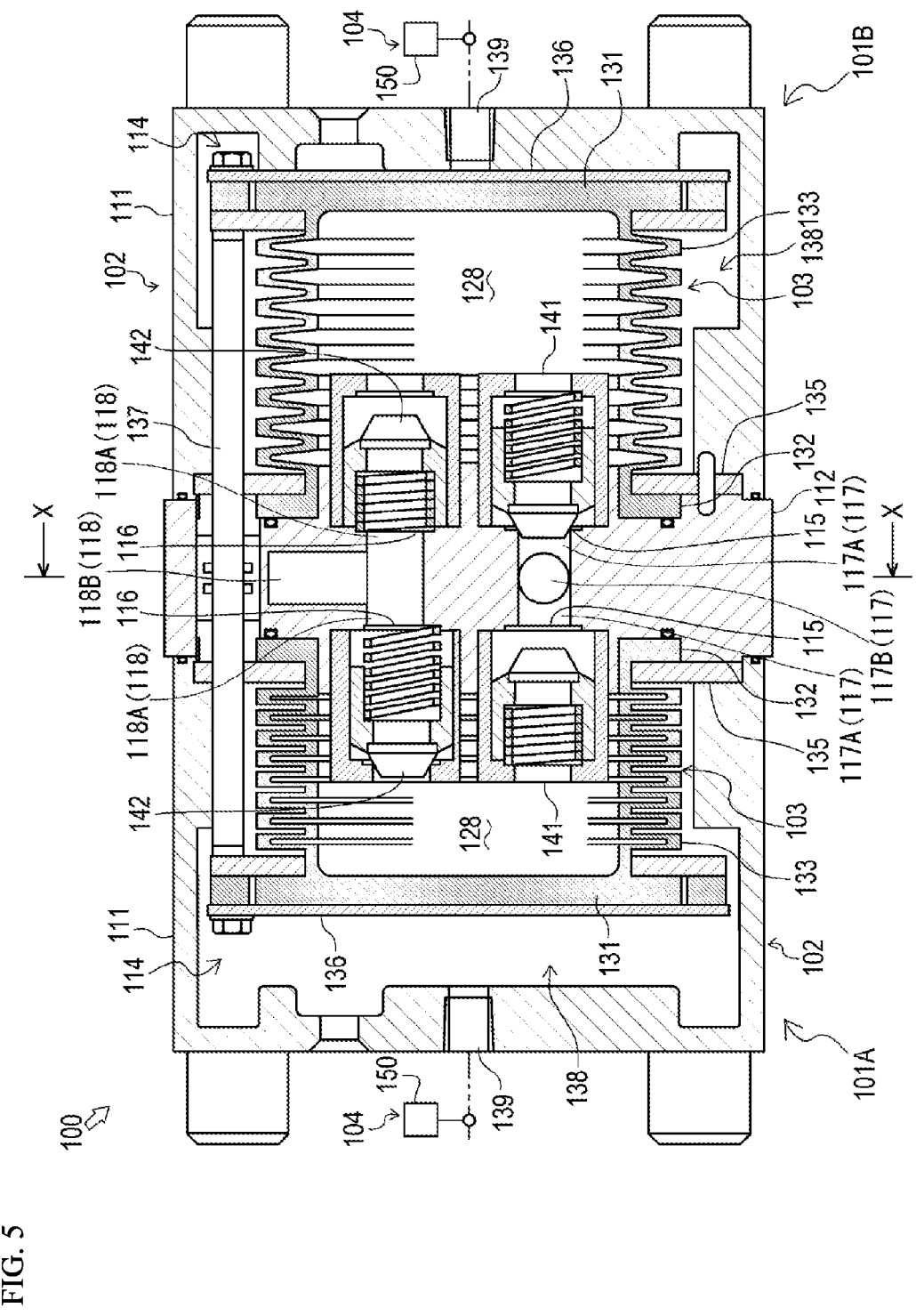
FIG. 5 is a side sectional view of a reciprocating pump according to a second embodiment of the present invention.

A reciprocating pump according to the second embodiment of the present invention is a bellows pump 100 for transferring fluid including liquids such as chemical solutions. As shown in FIG. 5, the bellows pump 100 is a double-acting bellows pump including a first pump 101A and a second pump 101B.

The first pump 101A and the second pump 101B, which have substantially the same configuration, are arranged symmetrically with respect to a center line in the longitudinal direction of the bellows pump 100; the pumps 101A and 101B are configured to be operated complementarily during operation of the bellows pump 100.

Each of the first pump 101A and the second pump 101B includes a housing 102, a reciprocated member (bellows) 103, an actuator 104, and pressure gauges 106. The bellows pump 100 further includes a control device (not shown).

The housing 102 has a fluid channel including a suction port 115, a discharge port 116, and a pump chamber 128 communicating with the ports. The housing 102 includes a pump casing 111 and a pump head 112. The pump head 112 is shared between the first pump 101A and the second pump 101B.

The pump casing 111 is made of resin, metal, another material, or a combination of them, and preferably has resistance to corrosion of its surface. For example, the pump casing 111 is made of aluminum or the like coated with fluororesin such as PTFE. The pump casing 111 has a bottomed cylindrical shape and is disposed to be open toward the pump head 112.

The pump head 112 is made of resin, metal, another material, or a combination of them, and preferably has corrosion resistance. For example, the pump head 112 is made of fluororesin such as PTFE. The pump head 112 has a disk shape corresponding to the shape of the pump casing 111. The pump head 112 is arranged coaxially with the pump casing 111.

The pump head 112 is airtightly attached to the pump casing 111 to close the opening of the pump casing 111. Thus, interior space 114 is formed, which is enclosed by the pump casing 111 and the pump head 112 in the housing 102.

The pump head 112 has the fluid channel including the suction port 115, the discharge port 116, a suction-side fluid channel 117, and a discharge-side fluid channel 118. The suction-side fluid channel 117 is provided in the pump head 112 to communicate with the suction port 115 and is connected to a device (not shown) predetermined as a fluid destination via a suction-side valve, piping, and others.

The discharge-side fluid channel 118 is provided in the pump head 112 to communicate with the discharge port 116 and is connected to a device (not shown) predetermined as a fluid destination via a discharge-side valve, piping, and others.

The suction-side fluid channel 117 and the discharge-side fluid channel 118 are formed to change their respective directions in the middle; one of them constitutes a measured channel 117A or 118A where to-be-measured fluid flows, and the other constitutes a non-measured channel 117B or 118B where to-be-measured fluid does not flow.

More specifically, a channel located closer to the suction port 115 in the suction-side fluid channel 117 is the measured channel 117A, and a channel located away from the suction port 115 is the non-measured channel 117B. A channel located closer to the discharge port 116 in the discharge-side fluid channel 118 is the measured channel 118A, and a channel located away from the discharge port 116 is the non-measured channel 118B.

The measured channels 117A and 118A are shaped to have a flat channel wall at least partially; the non-measured channels 117B and 118B are shaped arbitrarily. For example, the measured channels 117A and 118A have rectangular or semicircular cross-sections; the non-measured channels 117B and 118B have circular cross-sections.

Figure 6:
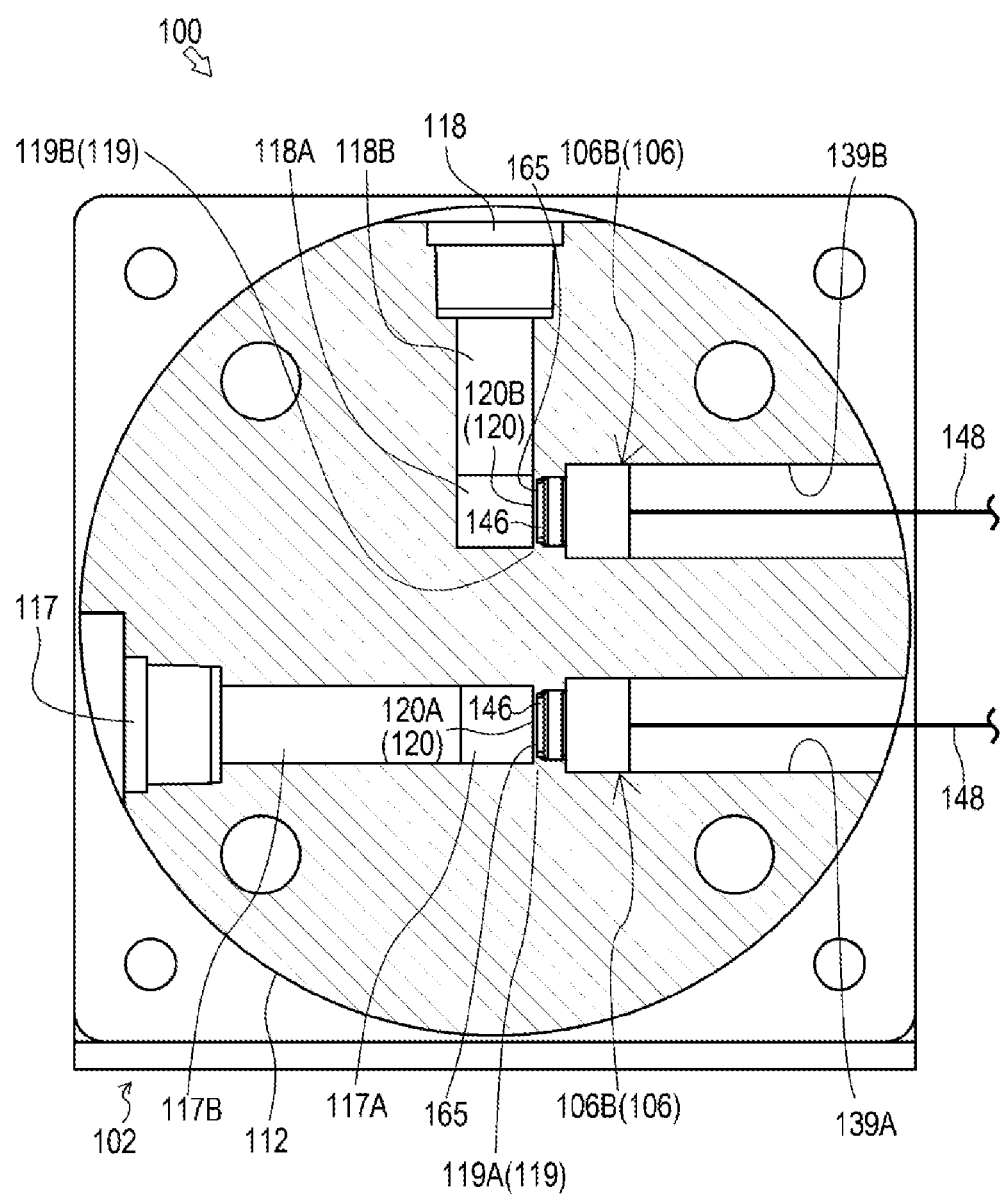
FIG. 6 is a front sectional view (a cross-sectional view taken along lines X-X) of the reciprocating pump in FIG. 5.

As shown in FIG. 6, the housing 102 has inner walls 119 and membranous portions 120. The inner walls 119 face the fluid channel. The membranous portions 120 have flexibility and are placed continuously next to the inner walls 119 to face the fluid channel.

The inner walls 119 include a suction-side inner wall 119A and a discharge-side inner wall 119B in the pump head 112. The suction-side inner wall 119A faces the suction-side fluid channel 117 (the measured channel 117A) in the fluid channel; the discharge-side inner wall 119B faces the discharge-side fluid channel 118 (the measured channel 118A) in the fluid channel. An inner surface of the suction-side inner wall 119A constitutes a flat channel wall of the measured channel 117A; an inner surface of the discharge-side inner wall 119B constitutes a flat channel wall of the measured channel 118A.

The membranous portions 120 include a suction-side membranous portion 120A next to the suction-side inner wall 119A and a discharge-side membranous portion 120B next to the discharge-side inner wall 119B. The suction-side membranous portion 120A is placed continuously next to the suction-side inner wall 119A to face the suction-side fluid channel 117 (the measured channel 117A) in the fluid channel. An inner surface of the suction-side membranous portion 120A constitutes a flat channel wall of the measured channel 117A.

The discharge-side membranous portion 120B is placed continuously next to the discharge-side inner wall 119B to face the discharge-side fluid channel 118 (the measured channel 118A) in the fluid channel. An inner surface of the discharge-side membranous portion 120B constitutes a flat channel wall of the measured channel 118A. The membranous portions 120 are made substantially flat to form the suction-side fluid channel 117 (the flat channel wall of the measured channel 117A) and the discharge-side fluid channel 118 (the flat channel wall of the measured channel 118A) in cooperation with the inner walls 119.

The bellows 103 is disposed to form the pump chamber 128 in the fluid channel in the housing 102 and is reciprocable in the housing 102 (extendable and contractible) to suck fluid into the pump chamber 128 through the suction port 115, and discharge the fluid from the pump chamber 128 through the discharge port 116.

The bellows 103 is made of resin. For example, the bellows 103 is made of fluororesin such as PTFE. The bellows 103 has a bottomed cylindrical shape. The bellows 103 is attached to the pump head 112 so that the opening of the bellows 103 is closed by the pump head 112. The bellows is provided to be extendable and contractible in the axial direction of the pump casing 111.

Specifically, the bellows 103 has a closed end portion 131, an open end portion 132, and a pleated portion 133. The closed end portion 131 is provided at the bottom of the bellows 103. The open end portion 132 is provided at the opening of the bellows 103. The pleated portion 133 has a tubular shape and connects the closed end portion 131 with the open end portion 132.

The closed end portion 131 and the pleated portion 133 are provided in the pump casing 111 and are disposed coaxially with the pump casing 111 and the pump head 112 together with the open end portion 132. The open end portion 132 is engaged with the pump head 112 by an annular engaging member 135 to fix the bellows 103 to the pump head 112.

The closed end portion 131 is connected to a movable body 136, which is disposed opposite to the pleated portion 133. The movable body 136 is connected to a movable body 136 of the other pump 101B (101A) via a connecting rod 137. The connecting rod 137 is provided through the pump head 112 reciprocably in the extension and contraction direction of the bellows 103.

The bellows 103 protrudes from the pump head 112 in the axial direction of the housing 102 and can extend from the pump head 112 or contract toward it in the axial direction of the housing 102 to reciprocate the connecting rod 137; the open end portion 132, which constitutes a protrusion end portion of the bellows 103, is fixed to the pump head 112.

The bellows 103 liquid-tightly and airtightly partitions the interior space 114 of the housing 102 into the pump chamber 128 and an air chamber 138. The pump chamber 128 is enclosed by the bellows 103 (the closed end portion 131 and the pleated portion 133) and the pump head 112.

Thus, the pump chamber 128 can be changed (increased or decreased) in volume by the reciprocation of the bellows 103 in the axial direction of the housing 102, specifically, change in shape due to extension or contraction of the pleated portion 133 and accompanying change in position of the closed end portion 131.

The pump chamber 128 communicates with the suction port 115 and the discharge port 116. During operation of the bellows pump 100, the pump chamber 128 can temporarily store fluid sucked through the suction port 115 until it is discharged to the outside. The air chamber 138 is connected to an air inlet and outlet hole 139 so that air can be supplied and discharged through the air inlet and outlet hole 139.

The suction port 115 is provided with a suction-side check valve 141. The suction-side check valve 141 is attached to the pump head 112 to be located between the suction-side fluid channel 117 (the suction port 115) and the pump chamber 128. The suction-side check valve 141 is configured to allow fluid flowing only in one direction from the suction-side fluid channel 117 to the pump chamber 128.

The discharge port 116 is provided with a discharge-side check valve 142. The discharge-side check valve 142 is attached to the pump head 112 to be located between the discharge-side fluid channel 118 (the discharge port 116) and the pump chamber 128. The discharge-side check valve 142 is configured to allow fluid flowing only in one direction from the pump chamber 128 to the discharge-side fluid channel 118.

The actuator 104 is configured to reciprocate the bellows 103 (extend and contract). The actuator 104 is configured to supply pressurized air from an air supply device 150 to the air chamber 138 and discharge air from the air chamber 138 to the outside through the air inlet and outlet hole 139 in the pump casing 111.

The pressure gauges 106 each have a pressure receiving portion 146 and are each configured to detect the pressure in the fluid channel via the pressure receiving portion 146. The pressure gauges 106 are attached to the housing 102 such that the membranous portion 120 in the housing 102 is sandwiched between the pressure receiving portion 146 and the fluid channel.

The pressure gauges 106 include a suction-side pressure gauge 106A and a discharge-side pressure gauge 106B. The suction-side pressure gauge 106A is configured to detect the pressure of fluid in the suction-side fluid channel 117 in the fluid channel by the pressure receiving portion 146. The discharge-side pressure gauge 106B is configured to detect the pressure of fluid in the discharge-side fluid channel 118 in the fluid channel by the pressure receiving portion 146.

Figure 7:
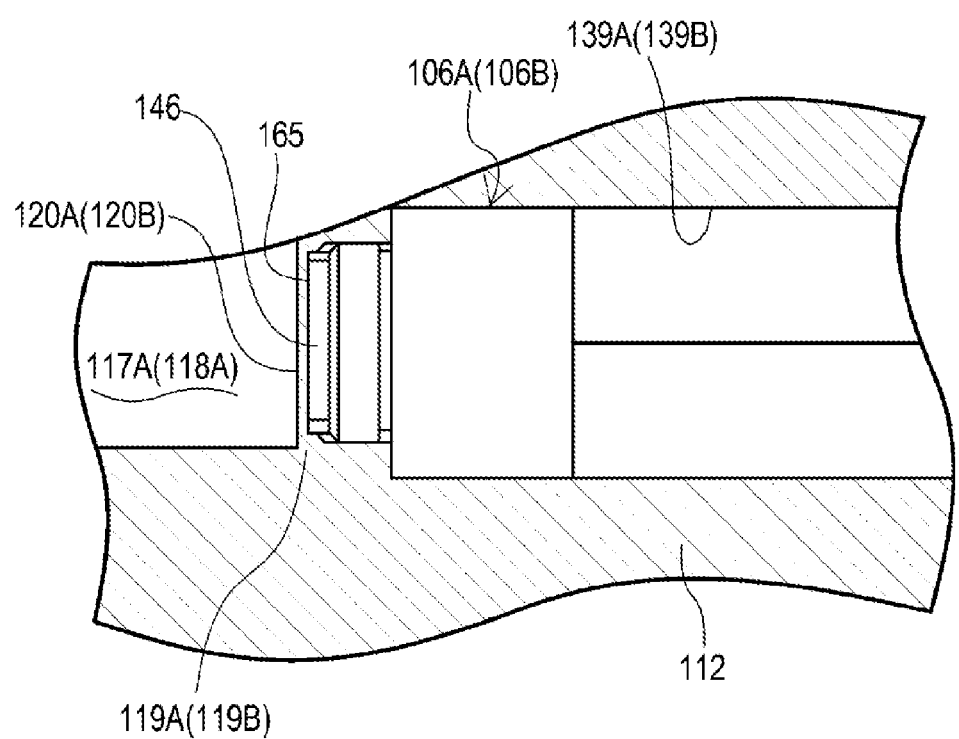
FIG. 7 is a front sectional view of the mounting structure of a pressure gauge in the reciprocating pump in FIG. 5.
Figure 8:
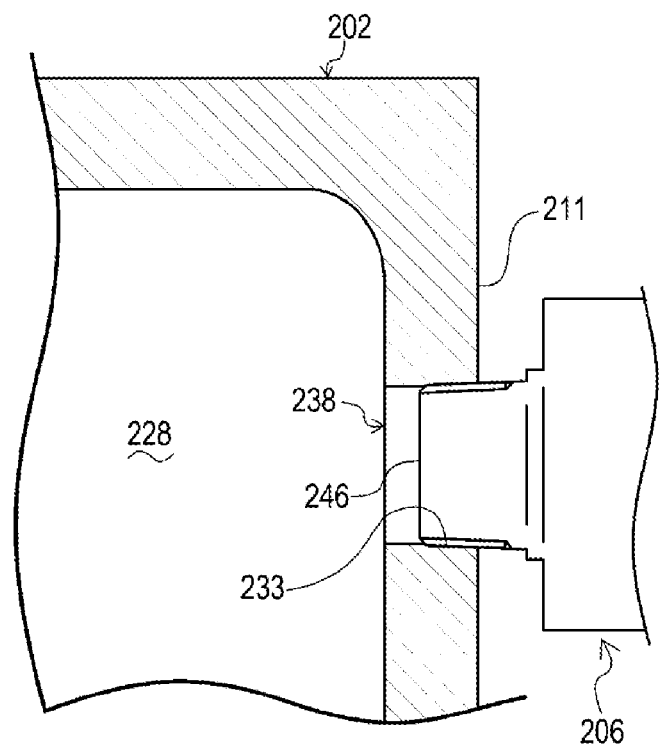
FIG. 8 is a cross-sectional view of the mounting structure of a pressure gauge in a conventional reciprocating pump.

As shown in FIGS. 6 and 7, the suction-side pressure gauge 106A is attached to the pump head 112 such that the suction-side membranous portion 120A is sandwiched between the pressure receiving portion 146 and the suction-side fluid channel 117 (the measured channel 117A). The discharge-side pressure gauge 106B is attached to the pump head 112 such that the discharge-side membranous portion 120B is sandwiched between the pressure receiving portion 146 and the discharge-side fluid channel 118 (the measured channel 118A).

More specifically, the suction-side pressure gauge 106A is held by any holding means to fit in a suction-side recess 139A in the pump head 112 from the outside of the pump head 112 (the housing 102) so that the pressure receiving portion 146 (an abutting surface 165) abuts on the suction-side membranous portion 120A from the side opposite to the suction-side fluid channel 117 (the side of the flat channel wall of the measured channel 117A).

The discharge-side pressure gauge 106B is held by any holding means to fit in a discharge-side recess 139B in the pump head 112 from the outside of the pump head 112 (the housing 102) so that the pressure receiving portion 146 (an abutting surface 165) abuts on the discharge-side membranous portion 120B from the side opposite to the discharge-side fluid channel 118 (the side of the flat channel wall of the measured channel 118A).

The suction-side pressure gauge 106A and the discharge-side pressure gauge 106B are positioned by the holding means in locations in the pump head 112 appropriate for their respective pressure receiving portions 146 to abut on the membranous portions 120. The abutting surfaces 165 of the suction-side pressure gauge 106A and the discharge-side pressure gauge 106B are shaped to suit the membranous portions 120, that is, substantially flat shapes.

Note that the holding means is not limited to a particular one, and may be one that fastens the pressure gauge 106 to the recess 139A (139B) with a screw to hold it in the pump head 112, or one that fixes the pressure gauge 106 with a holding member (a retaining member) to fit it in the recess 139A (139B) and thereby hold it in the pump head 112.

In this manner, the suction-side pressure gauge 106A and the discharge-side pressure gauge 106B are attached to the pump head 112 with the pressure receiving portions 146 abutting on the membranous portions 120. At least parts of the suction-side pressure gauge 106A and the discharge-side pressure gauge 106B including the pressure receiving portions 146 are incorporated in the housing 102 such that the suction-side pressure gauge 106A is isolated from the suction-side fluid channel 117 (the measured channel 117A), and the discharge-side pressure gauge 106B is isolated from the discharge-side fluid channel 118 (the measured channel 118A).

The suction-side recess 139A and the discharge-side recess 139B are disposed to be open in the same direction in the pump head 112. Thus, the suction-side pressure gauge 106A and the discharge-side pressure gauge 106B can fit in the suction-side recess 139A and the discharge-side recess 139B, respectively, from the same direction to be held in the pump head 112.

Wiring 148 of the pressure gauges 106 leads to the outside. The suction-side membranous portion 120A and the discharge-side membranous portion 120B are shaped to be so flexible not to interfere with the function of the pressure gauges 106 to detect the pressure of fluid in the suction-side fluid channel 117 and in the discharge-side fluid channel 118.

Specifically, the suction-side membranous portion 120A and the discharge-side membranous portion 120B are made of resin or metal. For example, the suction-side membranous portion 120A and the discharge-side membranous portion 120B are made of the same kind of material as the pump head 112. The suction-side membranous portion 120A and the discharge-side membranous portion 120B are formed such that their thickness (the width in the direction in which the membranous portions 120 are sandwiched) falls within the range from about 0.1 mm to about 1 mm, preferably from about 0.1 mm to about 0.5 mm.

The control device is for controlling the actuator 104 to contract or extend the bellows 103. The control device is connected to the air supply device 150 of the actuator 104, the suction-side valve, the discharge-side valve, and others; The control device is connected to the pressure gauges 106 via the wiring 168.

When the bellows pump 100 operates, the control device can perform the drive control of the actuator 104 to extend and contract the bellows 103 in the axial direction of the housing 102 such that the first pump 101A and the second pump 101B perform alternately suction and discharge processes for fluid transfer.

For example, when the first pump 101A performs a suction process, the control device operates the actuator 104 to supply compressed air to the air chamber 138 in the second pump 101B and to discharge air from the air chamber 138 in the first pump 101A to the outside, thereby causing the second pump 101B to perform a discharge process.

Consequently, the first pump 101A sucks fluid from the suction-side fluid channel 117 into the pump chamber 128 through the suction port 115. Simultaneously, the second pump 101B discharges fluid from the pump chamber 128 into the discharge-side fluid channel 118 through the discharge port 116.

When the first pump 101A performs a discharge process, the control device operates the actuator 104 to supply compressed air to the air chamber 138 in the first pump 101A and to discharge air from the air chamber 138 in the second pump 101B to the outside, thereby causing the second pump 101B to perform a suction process.

Consequently, the first pump 101A discharges fluid from the pump chamber 128 into the discharge-side fluid channel 118 through the discharge port 116. Simultaneously, the second pump 101B sucks fluid from the suction-side fluid channel 117 into the pump chamber 128 through the suction port 115.

The above-described configuration prevents space, which causes a liquid pool when fluid fills the fluid channel including the pump chamber 128 (the suction-side fluid channel 117 and the discharge-side fluid channel 118), from being formed in the fluid channel due to what structure allows the pressure gauges 106 to be mounted thereon. This can prevent the liquid pool from forming in the fluid channel. Therefore, the bellows pump 100 can be used to transfer fluid while maintaining the fluid at excellent purity.

In view of the above-described teaching, it is obvious that the present invention can have many variations and modifications. It is therefore to be understood that the present invention can have an embodiment other than those described above within the scope of the attached claims.

For example, the pressure gauge 6 of the first embodiment may be connected to the controller 47 via the wiring 48 so that the controller 47 acquires a result of detection from the pressure gauge 6. The controller 47 may be incorporated in the control device 8. In that case, the motor 40 and the encoder 45 are directly connected to the control device 8, and the control device 8 outputs signal pulses for driving the motor 40 to the motor 40, and it acquires signal pulses output from the encoder 45.

The measured channels of the second embodiment with the inner wall 119 and the membranous portion 120 may be formed in any place in the fluid channel including the suction port 115, the discharge port 116, and the pump chamber 128 communicating with the ports. For example, the measured channels may be channels in the suction-side fluid channel 117 and the discharge-side fluid channel 118, the channels are located away from the suction port 115 and the discharge port 116; or the measured channels may be portions facing the pump chamber 128 in the pump head 112.

DESCRIPTION OF REFERENCE NUMERALS

1: diaphragm pump (reciprocating pump); 2: housing; 3: rolling diaphragm (reciprocated member); 4: actuator; 6: pressure gauge; 19: inner wall; 20: membranous portion; 28: pump chamber (fluid channel); 46: pressure receiving portion; 100: bellows pump (reciprocating pump); 102: housing; 103: bellows (reciprocated member); 104: actuator; 106: pressure gauge; 117: suction-side fluid channel (fluid channel); 118: discharge-side fluid channel (fluid channel); 119: inner wall; 120: membranous portion; 146: pressure receiving portion.

What is claimed is:

1. A reciprocating pump for transferring fluid, comprising:
   a housing with a fluid channel that includes a suction port, a discharge port, and a pump chamber communicating with the ports;

a reciprocated member that is disposed in the housing to form the pump chamber in a reciprocable manner such that the fluid is sucked into the pump chamber through the suction port and discharged from the pump chamber through the discharge port;

an actuator configured to reciprocate the reciprocated member; and a pressure gauge with a pressure receiving portion, configured to detect pressure of the fluid in the fluid channel via the pressure receiving portion, wherein the housing includes:
   an inner wall facing the fluid channel; and
   a membranous portion made of a same kind of material as the inner wall, integrally formed with the inner wall, having flexibility due to having a thickness smaller than a thickness of the inner wall, placed continuously next to the inner wall to face the fluid channel, and including an inner surface that faces the pump chamber and that is coplanar with an inner surface of the inner wall that faces the pump chamber, and the pressure gauge is attached to the housing such that the membranous portion is sandwiched between the pressure receiving portion and the fluid channel.

2. The reciprocating pump according to claim 1, wherein the reciprocated member comprises a rolling diaphragm.

3. The reciprocating pump according to claim 1, wherein the reciprocated member comprises a bellows.

* * * * *